United States Patent
Kim et al.

(10) Patent No.: US 10,254,800 B2
(45) Date of Patent: Apr. 9, 2019

(54) PORTABLE ELECTRONIC APPARATUS

(71) Applicant: Samsung Display Co., Ltd., Yongin-si, Gyeonggi-do (KR)

(72) Inventors: Hoonsik Kim, Yongin-si (KR); Hyeeun Park, Yongin-si (KR); Dongwoo Seo, Yongin-si (KR); Changyong Jeong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/985,651

(22) Filed: May 21, 2018

(65) Prior Publication Data

US 2018/0267576 A1  Sep. 20, 2018

Related U.S. Application Data

(63) Continuation of application No. 14/656,561, filed on Mar. 12, 2015, now Pat. No. 9,977,468.

(30) Foreign Application Priority Data

Jul. 29, 2014  (KR) .................. 10-2014-0096757

(51) Int. Cl.
| | | |
|---|---|---|
| *G02F 1/133* | (2006.01) | |
| *G06F 1/16* | (2006.01) | |
| *F21V 11/00* | (2015.01) | |
| *H01L 51/50* | (2006.01) | |

(52) U.S. Cl.
CPC ............ *G06F 1/1656* (2013.01); *F21V 11/00* (2013.01); *G02F 1/133* (2013.01); *H01L 51/50* (2013.01)

(58) Field of Classification Search
CPC .. G02F 1/133; G02F 1/133394; G02F 1/1343; F21V 11/00; H01L 51/50; H01L 33/08
USPC .............. 349/143, 158; 359/893; 257/40, 88
See application file for complete search history.

(56) References Cited

U.S. PATENT DOCUMENTS

| | | |
|---|---|---|
| 5,739,946 A | 4/1998 | Iwanaga et al. |
| 8,142,249 B2 | 3/2012 | Kobayashi et al. |
| 2008/0013034 A1 | 1/2008 | Kim et al. |
| 2009/0244456 A1 | 10/2009 | Miyazaki et al. |

(Continued)

FOREIGN PATENT DOCUMENTS

| | | |
|---|---|---|
| CN | 104779266 A | 7/2015 |
| EP | 2 894 672 A1 | 7/2015 |

(Continued)

OTHER PUBLICATIONS

Wyser, Y. et al., Predicting and Determining the Bending Stiffness of Thin Films and Laminates, Packaging Technology and Science, 2001, 14, pp. 97-108, John Wiley & Sons, Ltd.

*Primary Examiner* — Steven T Sawyer
(74) *Attorney, Agent, or Firm* — Lewis Roca Rothgerber Christie LLP

(57) ABSTRACT

A portable electronic apparatus includes a display panel which is flexible and thus prevents or protects a defect from occurring when the portable electronic apparatus is bent. The portable electronic apparatus includes: a display panel configured to display an image; a window that is disposed over an image display surface of the display panel; a functional plate that is disposed between the display panel and the window; and a first adhesive layer that is patterned and is disposed between the display panel and the functional plate or between the functional plate and the window.

6 Claims, 7 Drawing Sheets

(56) References Cited

U.S. PATENT DOCUMENTS

| | | |
|---|---|---|
| 2013/0201575 A1 | 8/2013 | Cheon |
| 2014/0267950 A1 | 9/2014 | Kang et al. |
| 2014/0306187 A1 | 10/2014 | Kim et al. |
| 2014/0346451 A1 | 11/2014 | Oh |
| 2015/0092122 A1 | 4/2015 | Youn |
| 2015/0200375 A1 | 7/2015 | Kim et al. |

FOREIGN PATENT DOCUMENTS

| | | |
|---|---|---|
| JP | 2008-116880 A | 5/2008 |
| KR | 10-0918740 B1 | 9/2009 |
| KR | 10-2013-0065242 A | 6/2013 |
| KR | 10-2013-0091548 A | 8/2013 |
| KR | 10-2015-0084257 | 7/2015 |

PORTABLE ELECTRONIC APPARATUS

CROSS-REFERENCE TO RELATED APPLICATION

This application is a continuation of U.S. patent application Ser. No. 14/656,561, filed Mar. 12, 2015, which claims priority to and the benefit of Korean Patent Application No. 10-2014-0096757, filed Jul. 29, 2014, the entire content of both of which is incorporated herein by reference.

BACKGROUND

1. Field

One or more embodiments of the present invention relate to a portable electronic apparatus including a display panel, and more particularly, to a portable electronic apparatus including a display panel which is flexible and thus prevents a defect from occurring when the portable electronic apparatus is bent.

2. Description of the Related Art

In general, a portable electronic apparatus includes a display panel in order to provide various information such as images, videos, state information, and operation information, and a user interface to easily operate the portable electronic apparatus. Recently, attempts have been made to manufacture flexible portable electronic apparatuses in order to improve the portability and usage convenience thereof.

SUMMARY

In a related art, portable apparatus including a display panel decoupling occurs between various elements when the portable electronic apparatus is bent.

Aspects of one or more embodiments of the present invention include a portable electronic apparatus including a display panel which is flexible and thus prevents (or protects) a defect from occurring when the portable electronic apparatus is bent.

Additional aspects will be set forth in part in the description which follows and, in part, will be apparent from the description, or may be learned by practice of the presented embodiments.

According to one or more embodiments of the present invention, a portable electronic apparatus includes: a display panel configured to display an image; a window that is disposed over an image display surface of the display panel; a functional plate that is disposed between the display panel and the window; and a first adhesive layer that is patterned and is disposed between the display panel and the functional plate or between the functional plate and the window.

An area of the first adhesive layer with respect to a reference area at a central portion of the display panel may be greater than an area of the first adhesive layer with respect to a reference area at an edge portion of the display panel.

The portable electronic apparatus may further include an auxiliary adhesive layer filled between patterns of the first adhesive layer. In this case, an adhesive force of the first adhesive layer may be greater than an adhesive force of the auxiliary adhesive layer.

The display panel may include a black matrix corresponding to a portion between pixels or subpixels, wherein the first adhesive layer corresponds to the black matrix.

The portable electronic apparatus may include a set or predetermined bending portion so that the portable electronic apparatus is configured to be bendable at the bending portion, wherein an area of the first adhesive layer with respect to a reference area at the bending portion of the display panel is different from an area of the first adhesive layer with respect to a reference area at an edge portion of the display panel. In this case, the area of the first adhesive layer per reference area at the bending portion of the display panel may be greater than the area of the first adhesive layer per reference area at the edge portion of the display panel.

The first adhesive layer may be patterned to have island shapes.

The first adhesive layer may be patterned to have stripe shapes. In this case, the first adhesive layer may be patterned to have the stripe shapes that cross or intersect each other.

The first adhesive layer may include a portion that is patterned to have island shapes and a portion that is patterned to have stripe shapes.

The first adhesive layer may be disposed between the display panel and the functional plate, and the portable electronic apparatus may further include a second adhesive layer that is patterned and is disposed between the functional plate and the window. In this case, an adhesive force of the first adhesive layer may be greater than an adhesive force of the second adhesive layer. Alternatively, an area of the first adhesive layer with respect to a reference area may be greater than an area of the second adhesive layer with respect to the reference area.

The first adhesive layer may be patterned to have stripe shapes, and the second adhesive layer is patterned to have island shapes.

The first adhesive layer may include a portion that is patterned to have island shapes and a portion that is patterned to have stripe shapes, and the second adhesive layer may be patterned to have only stripe shapes or only island shapes.

The functional plate may include a polarizing plate, a phase retardation plate, or a touch panel.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
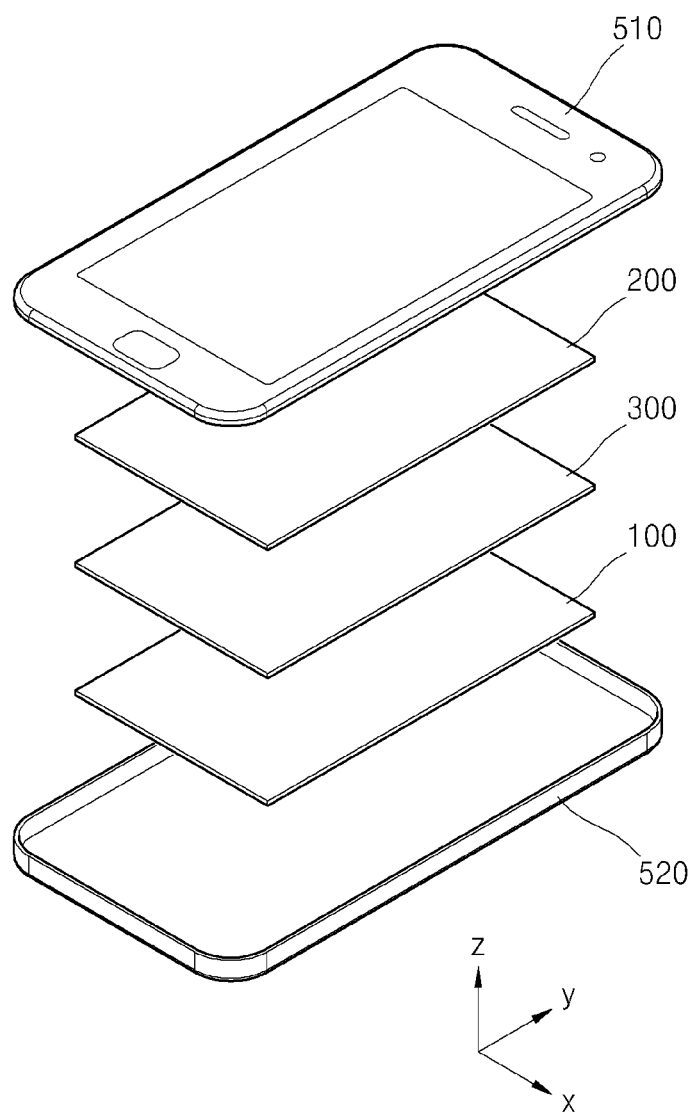
FIG. 1 is an exploded perspective view illustrating a portable electronic apparatus according to an embodiment of the present invention.

As used herein, the term "and/or" includes any and all combinations of one or more of the associated listed items. Expressions such as "at least one of," when preceding a list of elements, modify the entire list of elements and do not modify the individual elements of the list.

The present invention may include various embodiments and modifications, and exemplary embodiments thereof will be illustrated in the drawings and will be described herein in detail. The effects and features of the present invention and the accompanying methods will become apparent from the following description of the embodiments, taken in conjunction with the accompanying drawings. However, the present invention is not limited to the embodiments described below, and may be embodied in various modes.

The present invention will now be described more fully with reference to the accompanying drawings, in which exemplary embodiments of the invention are shown. The same or corresponding elements in the drawings are denoted by the same reference numerals, and a repeated explanation thereof will not be given.

It will be understood that when a component, such as a layer, a film, a region, or a plate, is referred to as being "on" another component, the component may be directly on the other component, or one or more intervening components may be present thereon. In contrast, when a component is referred to as being "directly on", there are no intervening components present. Sizes of components in the drawings may be exaggerated for convenience of explanation. In other words, since sizes and thicknesses of components in the drawings are arbitrarily illustrated for convenience of explanation, the following embodiments are not limited thereto.

It will be understood that, although the terms "first", "second", "third", etc., may be used herein to describe various components, these components should not be limited by these terms. These terms are only used to distinguish one component, from another component. Thus, a first component discussed below could be termed a second component, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, the use of "may" when describing embodiments of the inventive concept refers to "one or more embodiments of the inventive concept." Also, the term "exemplary" is intended to refer to an example or illustration.

It will be understood that when an element or layer is referred to as being "connected to", "coupled to", or "adjacent to" another element or layer, it can be directly connected to, coupled to, or adjacent to the other element or layer, or one or more intervening elements or layers may be present. In contrast, when an element or layer is referred to as being "directly connected to", "directly coupled to", or "immediately adjacent to" another element or layer, there are no intervening elements or layers present.

As used herein, the term "substantially," "about," and similar terms are used as terms of approximation and not as terms of degree, and are intended to account for the inherent deviations in measured or calculated values that would be recognized by those of ordinary skill in the art.

As used herein, the terms "use," "using," and "used" may be considered synonymous with the terms "utilize," "utilizing," and "utilized," respectively.

In the following examples, the x-axis, the y-axis, and the z-axis are not limited to three axes of the rectangular coordinate system, and may be interpreted in a broader sense. For example, the x-axis, the y-axis, and the z-axis may be perpendicular to one another or may represent different directions that are not perpendicular to one another.

Figure 2:
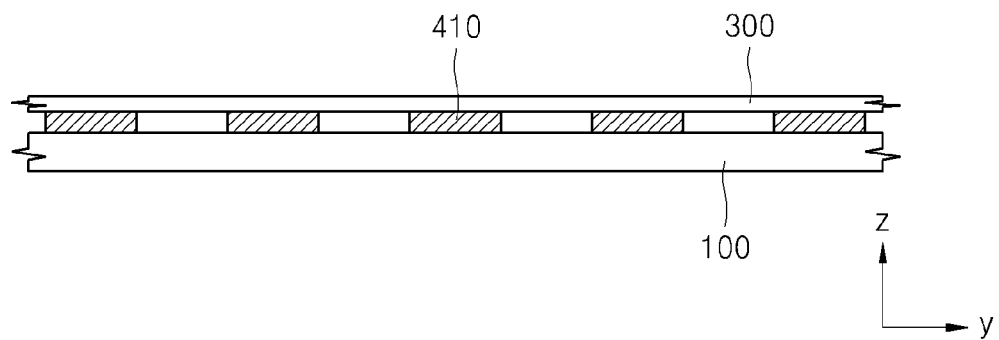
FIG. 2 is a cross-sectional view illustrating a part of the portable electronic apparatus of FIG. 1.

FIG. 1 is an exploded perspective view illustrating a portable electronic apparatus according to an embodiment of the present invention. FIG. 2 is a cross-sectional view illustrating a part of the portable electronic apparatus of FIG. 1.

Referring to FIG. 1, the portable electronic apparatus includes a display panel 100, a window 510, a functional plate 300, and a first adhesive layer 410 (not shown in FIG. 1 for convenience of explanation, but shown in FIG. 2). The first adhesive layer 410 may be, for example, a pressure sensitive adhesive (PSA) layer. Examples of the PSA layer may include an optically clear adhesive (OCA) layer and an optically clear resin (OCR) layer. The present embodiment is not limited thereto, and the portable electronic apparatus may further include an additional functional plate 200 as shown in FIG. 1.

The display panel 100 on which an image may be displayed may be, for example, an organic light-emitting display panel. The display panel 100 may be flexible. In this case, the display panel 100 may include a substrate including a material such as polyimide (PI) or polyethylene terephthalate (PET).

The window 510 may be disposed over an image display surface of the display panel 100. The window 510 is a light-passing window through which light that is generated in the display panel 100 or that passes through the display panel 100 may be emitted to the outside. The window 510 may function to protect the display panel 100 from the outside and also may function as an anti-reflection film. The window 510 may be a film formed of an organic material such as PI or PET, or may be formed of an inorganic material such as thin glass or sapphire. Alternatively, the window 510 may be formed of a combination of organic and inorganic materials.

The functional plate 300 may be disposed between the display panel 100 and the window 510. The functional plate 300 may be, for example, a polarizing plate, a phase retardation plate, or a touch panel.

The portable electronic apparatus of the present embodiment may further include a housing 520 in which the display panel 100, the window 510, and the functional plate 300 are accommodated. Also, other elements may be further provided between, behind, or in front of the display panel 100, the window 510, and the functional plate 300. Also, the functional plate 300 may be a polarizing plate, and the additional functional plate 200 may be a touch panel.

The first adhesive layer 410 that is patterned is disposed between the display panel 100 and the functional plate 300 or between the functional plate 300 and the window 510. In FIG. 2, the first adhesive layer 410 that is patterned is disposed between the display panel 100 and the functional plate 300.

When the portable electronic apparatus has a multi-layer structure including the display panel 100, the window 510, and the functional plate 300, it is necessary to adhere at least some of the elements to be not separated from one another. In FIG. 2, the first adhesive layer 410 that is patterned is disposed between the display panel 100 and the functional plate 300 to adhere the display panel 100 with the functional plate 300.

If the display panel 100 and the functional plate 300 are entirely adhered to each other by using an adhesive layer that is not patterned, unlike in the portable electronic apparatus of the present embodiment, an overall bending stiffness of the portable electronic apparatus is rapidly increased and may become greater than that in the case when the display panel 100 and the functional plate 300 are not adhered to each other. This is because an overall bending stiffness of the display panel 100 and the functional plate 300 when the display panel 100 and the functional plate 300 are not adhered to each other is equal to a sum of a bending stiffness of the display panel 100 and a bending stiffness of the functional plate 300, whereas an overall bending stiffness when the display panel 100 and the functional plate 300 are adhered to each other by using an adhesive layer is equal to a sum of a bending stiffness of the display panel 100, a bending stiffness of the functional plate 300 and a bending stiffness obtained by coupling the display panel 100 and the functional plate 300.

To put it another way, if the display panel 100 and the functional plate 300 are entirely adhered to each other by using an adhesive layer that is not patterned, an overall bending stiffness of the portable electronic apparatus is rapidly increased, thereby rapidly degrading the flexibility of the portable electronic apparatus. In addition, when the portable electronic apparatus is bent, decoupling may occur between the display panel 100 and the functional plate 300 due to a difference between a stress that is applied to the display panel 100 and a stress that is applied to the functional plate 300.

However, in the portable electronic apparatus of the present embodiment, the first adhesive layer 410 is patterned and then is disposed between the display panel 100 and the functional plate 300 to adhere the display panel 100 with the functional plate 300. Since the first adhesive layer 410 is patterned, a bending stiffness obtained by coupling the display panel 100 and the functional plate 300 may be greatly reduced to be less than a bending stiffness obtained by coupling the display panel 100 and the functional plate 300 when the adhesive layer is not patterned. As a result, since an overall bending stiffness of the display panel 100 and the functional plate 300 that are adhered to each other by using the first adhesive layer 410 that is patterned is reduced, the flexibility of the portable electronic apparatus may be maintained and the display panel 100 and the functional plate 300 may be adhered to each other.

The first adhesive layer 410 may be patterned to have any of various shapes. For example, the first adhesive layer 410 may be patterned to have island shapes that are spaced apart from one another or may be patterned to have stripe shapes. In the latter case, the first adhesive layer 410 may be patterned to have stripe shapes that cross or intersect each other. Alternatively, the first adhesive layer 410 may be patterned to have hybrid shapes including a portion that is patterned to have island shapes and a portion that is patterned to have stripe shapes.

Figure 3:
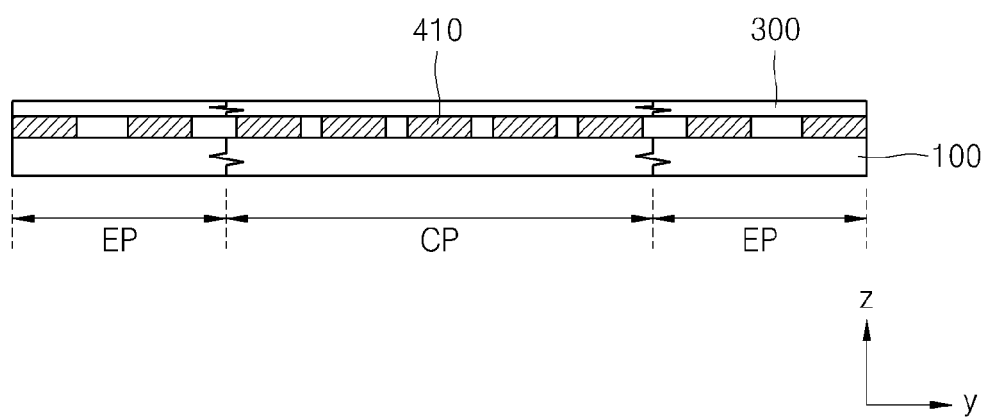
FIG. 3 is a cross-sectional view illustrating a part of a portable electronic apparatus according to another embodiment of the present invention.

FIG. 3 is a cross-sectional view illustrating a part of a portable electronic apparatus according to another embodiment of the present invention. In the portable electronic apparatus of FIG. 3, an area of the first adhesive layer 410 with respect to a reference area at a central portion CP of the display panel 100 is greater than an area of the first adhesive layer 410 with respect to a reference area at an edge portion EP of the display panel 100. The term 'reference area' used herein may refer to an area with a fixed specific size that is greater than an area of a largest island (on an xy plane) seen in a direction perpendicular to the display panel 100 when the first adhesive layer 410 is patterned into islands that are spaced apart from one another. This means that an area of the first adhesive layer 410 per unit area at a central portion CP of the display panel 100 is greater than an area of the first adhesive layer 410 per unit area at an edge portion EP of the display panel 100.

The patterning of the first adhesive layer 410 into islands that are spaced apart from one another may be obtained by enabling areas of the islands (on the xy plane) seen in the direction perpendicular to the display panel 100 to be the same and enabling a center-to-center interval between the islands at the central portion CP of the display panel 100 to be less than a center-to-center interval between the islands at the edge portion EP of the display panel 100. Alternatively, the patterning of the first adhesive layer 410 into islands that are spaced apart from one another may be obtained by enabling areas of the islands (on the xy plane) seen in the direction normal (e.g., perpendicular) to the display panel 100 to be different from one another and enabling the islands at the central portion CP of the display panel 100 to have large areas and the islands at the edge portion EP of the display panel 100 to have small areas.

When bending occurs in a state where the display panel 100 and the functional plate 300 are adhered to each other, a stress due to the adhesion between the display panel 100 and the functional plate 300 is less at a portion corresponding to the edge portion EP of the display panel 100 than at a portion corresponding to the central portion CP of the display panel 100. Accordingly, the possibility of decoupling occurring between the display panel 100 and the functional plate 300 is high at the central portion CP of the display panel 100.

However, in the portable electronic apparatus of FIG. 3, an area of the first adhesive layer 410 with respect to a reference area at the central portion CP of the display panel 100 is greater than an area of the first adhesive layer 410 with respect to a reference area at the edge portion EP of the display panel 100. Accordingly, the risk of decoupling of the display panel 100 and the functional plate 300 occurring at the central portion CP of the display panel 100 may be effectively reduced. Here, not only the risk of decoupling may be effectively reduced but also an overall bending stiffness of the portable electronic apparatus may be greatly reduced because the first adhesive layer 410 is patterned.

Although an area of the first adhesive layer 410 with respect to a reference area at the central portion CP of the display panel 100 is greater than an area of the first adhesive layer 410 with respect to a reference area at the edge portion EP of the display panel 100 in FIG. 3, the present embodiment is not limited thereto.

For example, the portable electronic apparatus of FIG. 3 may be a portable electronic apparatus that is foldable or bendable at a specific set or predetermined portion. The specific set or predetermined portion may be referred to as a bending portion. In this case, an area of the first adhesive layer 410 with respect to a reference area at the bending portion of the display panel 100 may be different from an area of the first adhesive layer 410 with respect to a reference area at the edge portion EP of the display panel 100. In more detail, an area of the first adhesive layer 410 with respect to the reference area at the bending portion of the display panel 100 may be greater than an area of the first adhesive layer 410 at the edge portion EP of the display panel 100.

The patterning of the first adhesive layer 410 into islands that are spaced apart from one another may be obtained by enabling areas of the islands (on the xy plane) seen in the direction normal (e.g., perpendicular) to the display panel 100 to be the same and enabling a center-to-center interval between the islands at the bending portion of the display panel 100 to be greater than a center-to-center interval between the islands at the edge portion EP of the display panel 100. Alternatively, the patterning of the first adhesive layer 410 into islands that are spaced apart from one another may be obtained by enabling areas of the islands (on the xy plane) seen in the direction normal (e.g., perpendicular) to the display panel 100 to be different from one another and enabling the islands at the bending portion of the display panel 100 to have small areas and the islands at the edge portion EP of the display panel 100 to have large areas.

When the portable electronic apparatus having bendable characteristics bends at the bending portion that is the specific set or predetermined portion, a low stress due to the adhesion between the display panel 100 and the functional plate 300 occurs at portions other than the bending portion of the portable electronic apparatus, whereas a relatively high stress occurs between the display panel 100 and the functional plate 300 at the bending portion. Accordingly, the possibility of decoupling occurring between the display panel 100 and the functional plate 300 at the bending portion of the display panel 100 is high.

However, in the portable electronic apparatus of FIG. 3, an area of the first adhesive layer 410 with respect to a reference area at the bending portion of the display panel 100 is greater than an area of the first adhesive layer 410 with respect to a reference area at the edge portion EP of the display panel 100. When an area of the first adhesive layer 410 is greater, the display panel 100 and the functional plate 300 may be more effectively adhered to each other. Accordingly, the risk of decoupling between the display panel 100 and the functional plate 300 at the bending portion of the display panel 100 may be effectively reduced.

Figure 4:
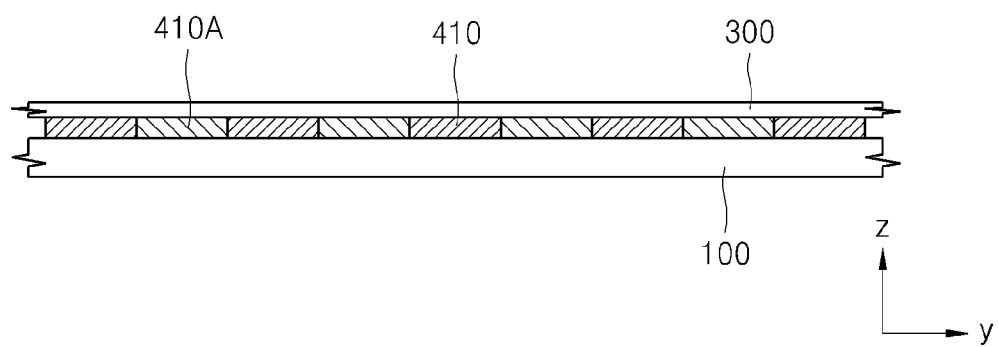
FIG. 4 is a cross-sectional view illustrating a part of a portable electronic apparatus according to another embodiment of the present invention.

FIG. 4 is a cross-sectional view illustrating a part of a portable electronic apparatus according to another embodiment of the present invention. The portable electronic apparatus of FIG. 4 further includes an auxiliary adhesive layer 410A that is filled between patterns of the first adhesive layer 410.

An image that is displayed on the display panel 100 is perceived by a viewer through the functional plate 300 and the window 510. In this case, since the first adhesive layer 410 is patterned, a part of the image that is displayed on the display panel 100 may be perceived by the viewer through the first adhesive layer 410, the functional plate 300, and the window 510, and the remaining part of the image may be perceived by the viewer through the functional plate 300 and the window 510 without passing through the first adhesive layer 410. As such, when layers through which the image is perceived by the viewer are different, the viewer may perceive a distorted image, instead of the image that is displayed on the display panel 100.

However, since the portable electronic apparatus of FIG. 4 includes the auxiliary adhesive layer 410A that is filled between the patterns of the first adhesive layer 410, a difference in layers through which an image that is displayed on the display panel 100 is perceived by the viewer may be reduced to some extent. In particular, image distortion mostly occurs due to a difference in a refractive index between layers through which light passes. Even when components of the first adhesive layer 410 and the auxiliary adhesive layer 410A are different from each other, as long as refractive indices of the first adhesive layer 410 and the auxiliary adhesive layer 410A are similar to each other, the image distortion may be greatly reduced.

In this case, an adhesive force of the first adhesive layer 410 may be greater than an adhesive force of the auxiliary adhesive layer 410A. That is, since the auxiliary adhesive layer 410A functions to reduce the image distortion when the viewer perceives an image that is displayed on the display panel 100, an adhesive force of the auxiliary adhesive layer 410A does not need to be as high as an adhesive force of the first adhesive layer 410. In particular, in order to reduce an overall bending stiffness of the portable electronic apparatus as described above, it is preferable that an adhesive force of the auxiliary adhesive layer 410A according to one embodiment of the present invention is less than an adhesive force of the first adhesive layer 410.

Even in FIG. 3, an auxiliary adhesive layer may be disposed between the patterns of the first adhesive layer 410. In this case, an area of the auxiliary adhesive layer with respect to a reference area at the central portion CP of the display panel 100 may be less than an area of the auxiliary adhesive layer with respect to a reference area at the edge portion EP of the display panel 100. Also, even when the portable electronic apparatus includes the bending portion as described above, the auxiliary adhesive layer may be disposed between the patterns of the first adhesive layer 410.

Figure 5:
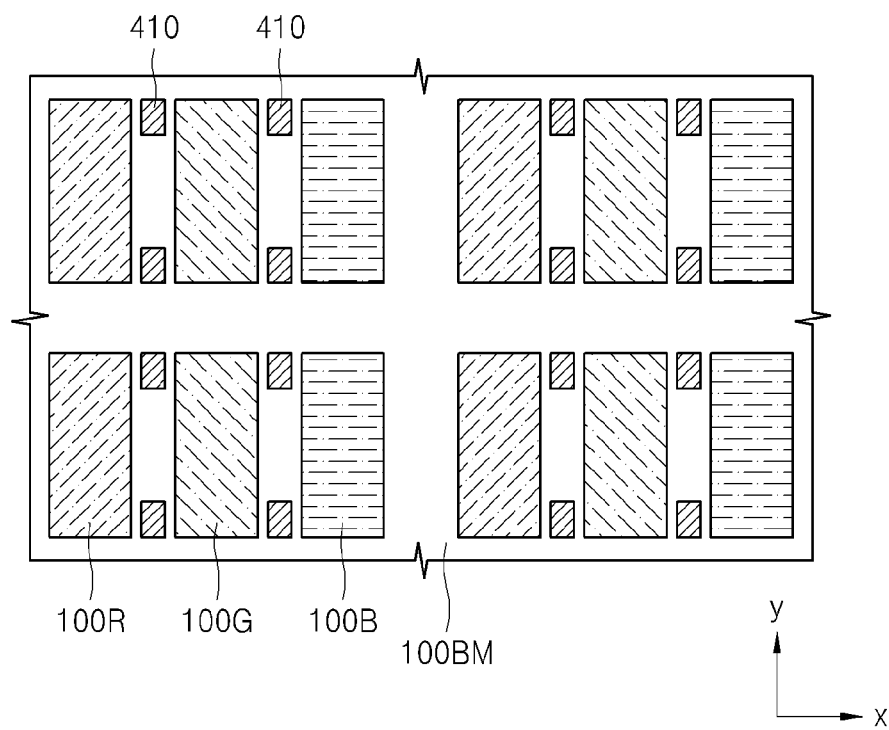
FIG. 5 is a conceptual plan view illustrating a part of a portable electronic apparatus according to another embodiment of the present invention.

FIG. 5 is a conceptual plan view illustrating a part of a portable electronic apparatus according to another embodiment of the present invention. Referring to FIG. 5, the display panel 100 includes a black matrix 100BM corresponding to a portion between pixels or subpixels 100R, 100G, and 100B. The first adhesive layer 410 that is patterned may correspond to the black matrix 100BM. In FIG. 5, the black matrix 100BM is entirely filled between the subpixels 100R, 100G, and 100B, and the first adhesive layer 410 is patterned to have island shapes and is disposed to correspond to the black matrix 100BM.

When an edge of the first adhesive layer 410 that is patterned overlaps at least a part of the subpixels 100R, 100G, and 100B, even when the first adhesive layer 410 allows light to pass therethrough, a part of the edge of the first adhesive layer 410 that is patterned may be perceived by a viewer who observes an image that is displayed on the display panel 100, thereby degrading the quality of the image that is displayed by the portable electronic apparatus.

However, according to the portable electronic apparatus of FIG. 5, since the first adhesive layer 410 is patterned to have island shapes and is disposed to correspond to the black matrix 100BM, the edge of the first adhesive layer 410 that is patterned may be effectively prevented from being perceived by the viewer.

Figure 6:
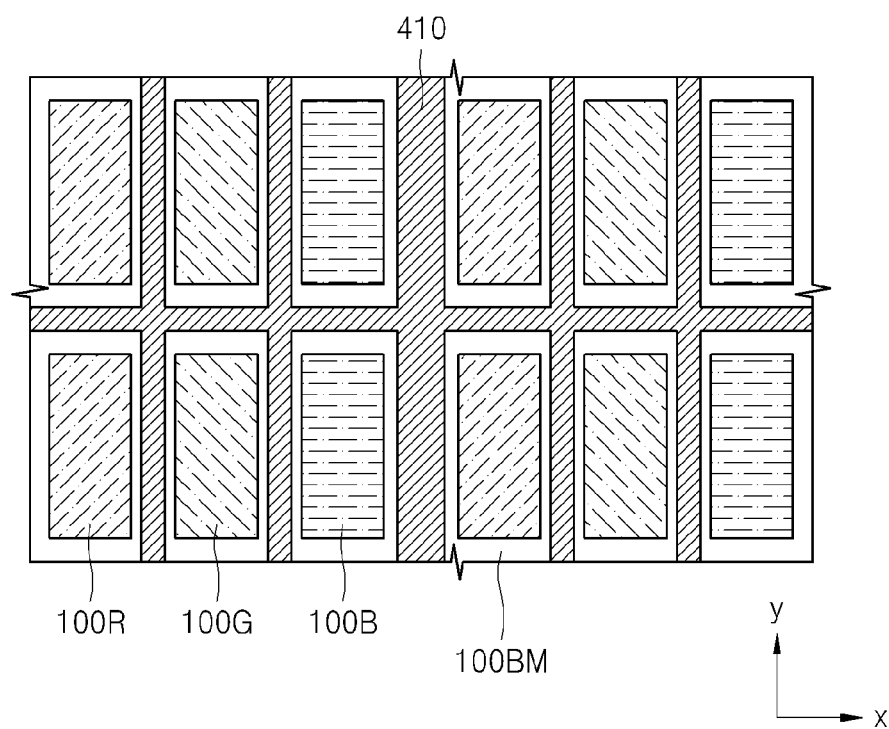
FIG. 6 is a conceptual plan view illustrating a part of a portable electronic apparatus according to another embodiment of the present invention.
Figure 7:
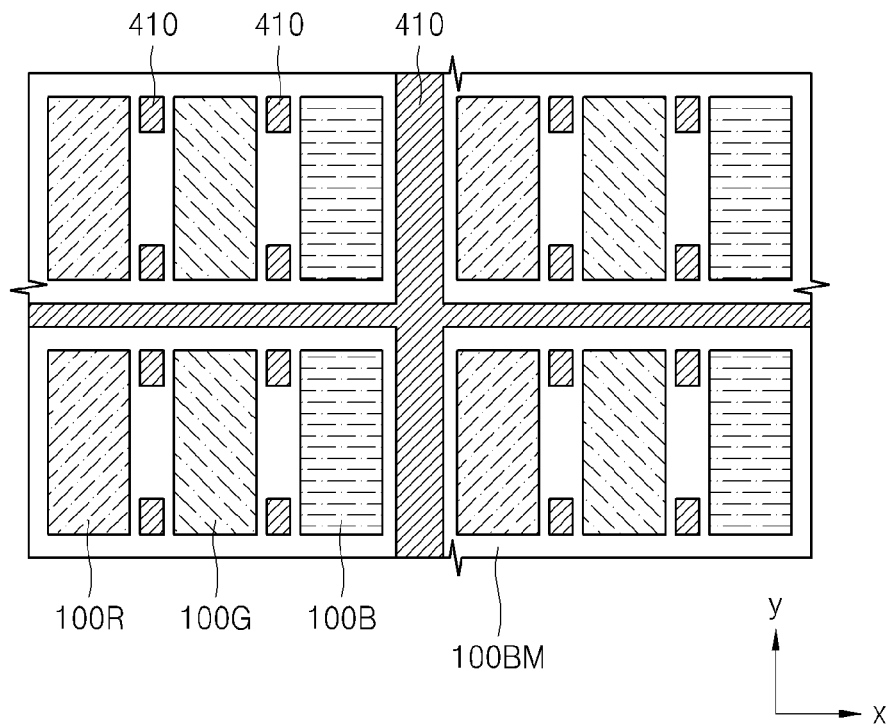
FIG. 7 is a conceptual plan view illustrating a part of a portable electronic apparatus according to another embodiment of the present invention.

FIG. 6 is a conceptual plan view illustrating a part of a portable electronic apparatus according to another embodiment of the present invention. Here, the first adhesive layer 410 may be patterned to have stripe shapes that, for example, cross or intersect each other, and may be disposed to correspond to the black matrix 100BM. Alternatively, FIG. 7 is a conceptual plan view illustrating a part of a portable electronic apparatus according to another embodiment of the present invention. Here, the first adhesive layer 410 may have hybrid shapes including a portion that is patterned to have island shapes and a portion that is patterned to have stripe shapes, and may be disposed to correspond to the black matrix 100BM.

Although the first adhesive layer 410 is disposed between the display panel 100 and the functional plate 300 as presented above, the present invention is not limited thereto. For example, the first adhesive layer 410, which is patterned to have any of various suitable shapes as shown in the previous embodiments, may be disposed between the window 510 and the functional plate 300.

Figure 8:
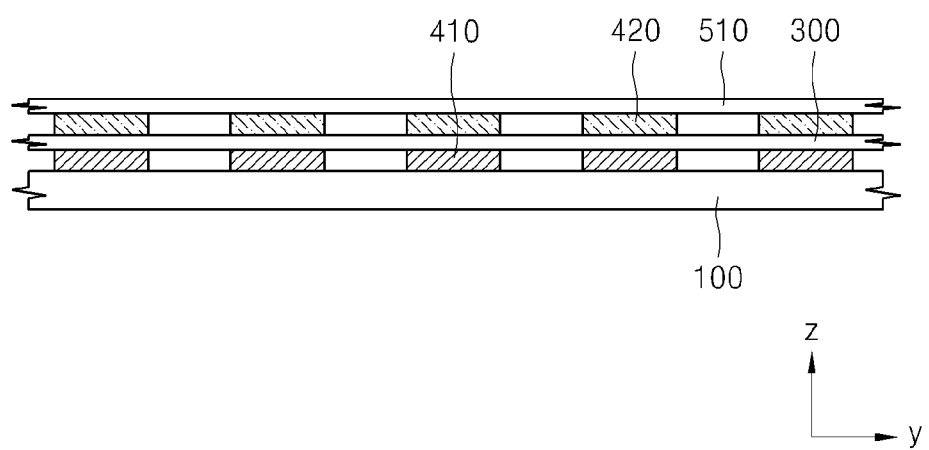
FIG. 8 is a cross-sectional view illustrating a part of a portable electronic apparatus according to another embodiment of the present invention.

Also, FIG. 8 is a cross-sectional view illustrating a part of a portable electronic apparatus according to another embodiment of the present invention. Here, the first adhesive layer 410 may be disposed between the display panel 100 and the functional plate 300 and a second adhesive layer 420 that is patterned may also be disposed between the window 510 and the functional plate 300. Accordingly, the display panel 100, the window 510, and the functional plate 300 are adhered to one another, and an overall bending stiffness of the portable electronic apparatus is reduced, thereby effectively maintaining the flexibility of the portable electronic apparatus.

Even in the portable electronic apparatus of FIG. 8, an area of the first adhesive layer 410 with respect to a reference area at the central portion CP of the display panel 100 may be greater than an area of the first adhesive layer 410 with respect to a reference area at the edge portion EP of the display panel 100, like in FIG. 3. An area of the second adhesive layer 420 with respect to the reference area at the central portion CP of the display panel 100 may be greater than an area of the second adhesive layer 420 with respect to the reference area at the edge portion EP of the display panel 100.

The portable electronic apparatus of FIG. 8 may include an auxiliary adhesive layer that is filled between patterns of the first adhesive layer 410, and may also include an additional auxiliary adhesive layer that is filled between patterns of the second adhesive layer 420. Also, the first adhesive layer 410 and/or the second adhesive layer 420 may be disposed to correspond to the black matrix 100BM of the display panel 100. The second adhesive layer 420 may also have any of various suitable patterns, like the first adhesive layer 410 of FIGS. 5 through 7.

Figure 9:
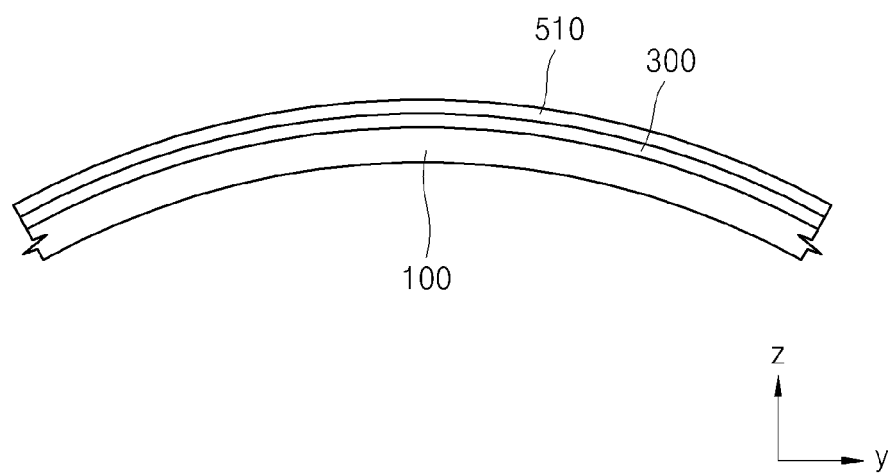
FIG. 9 is a cross-sectional view illustrating a state where the portable electronic apparatus of FIG. 8 bends.
Figure 10:
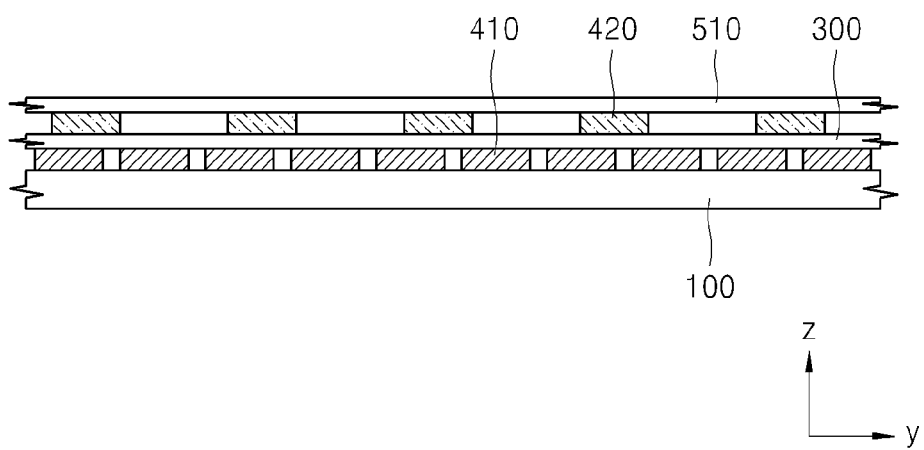
FIG. 10 is a cross-sectional view illustrating a part of a portable electronic apparatus according to another embodiment of the present invention.

FIG. 9 is a cross-sectional view illustrating a state where the portable electronic apparatus of FIG. 8 is bent. In FIG. 9, the first adhesive layer 410 that is disposed between the display panel 100 and the functional plate 300 and the second adhesive layer 420 that is disposed between the functional plate 300 and the window 510 are not shown for convenience.

In general, a thickness of the window 510 is less than a thickness of the display panel 100 or a thickness of the functional plate 300. Accordingly, flexibility of the window 510 is better than flexibility of the display panel 100 or flexibility of the functional plate 300. Hence, assuming that the portable electronic apparatus is bendable, even when an adhesive force of the second adhesive layer 420 between the window 510 and the functional plate 300 is less than an adhesive force of the first adhesive layer 410 between the functional plate 300 and the display panel 100, the window 510 may be prevented from being detached from the functional plate 300.

Alternatively, an area of the second adhesive layer 420 with respect to a reference area may be less than an area of the first adhesive layer 410 with respect to the reference area. For the same reason, even when an area of the second adhesive layer 420 with respect to the reference area is less than an area of the first adhesive layer 410 with respect to the reference area, the window 510 may be prevented from being detached from the functional plate 300 due to flexibility of the window 510. In addition, when an area of the second adhesive layer 420 with respect to the reference area is less than an area of the first adhesive layer 410 with respect to the reference area, an overall bending stiffness of the portable electronic apparatus may be greatly reduced. In this case, a basic adhesive force of a material of the first adhesive layer 410 and a basic adhesive force of a material of the second adhesive layer 420 may be the same. To this end, the first adhesive layer 410 may be patterned to have stripe shapes (as shown in FIG. 6) and the second adhesive layer 420 may be patterned to have island shapes (similarly to FIG. 5). Alternatively, the first adhesive layer 410 may include a portion that is patterned to have island shapes and a portion that is patterned to have stripe shapes (as shown in FIG. 7), and the second adhesive layer 420 may be patterned to have only stripe shapes (similarly to FIG. 6) or only island shapes (similarly to FIG. 5).

Although respective ends of the portable electronic apparatus in a +y direction and a −y direction are bent downward in a −z direction and a central portion of the display panel 100 are bent upward in a +z direction in FIG. 9, the present embodiment is not limited thereto. For example, the portable electronic apparatus of FIG. 9 may be bent in any of various other shapes, for example, a serpentine or 'ᄅ' shape.

Figure 11:
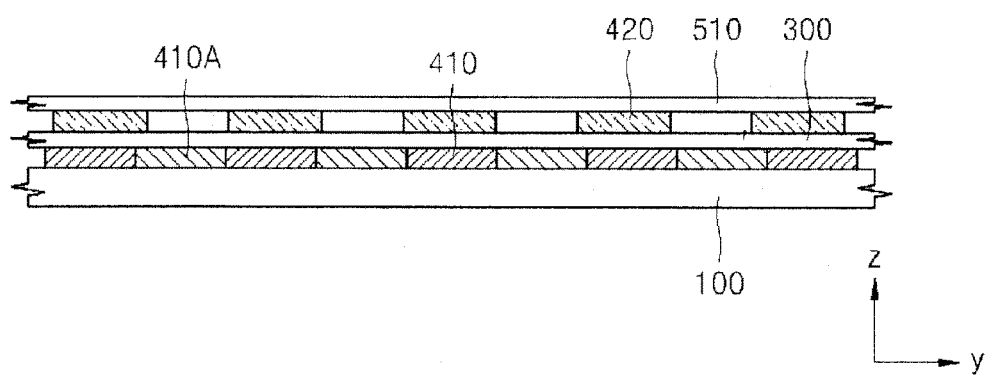
FIG. 11 is a cross-sectional view illustrating a part of a portable electronic apparatus according to another embodiment of the present invention.

FIG. 11 is a cross-sectional view illustrating a part of a portable electronic apparatus according to another embodiment of the present invention. Here, the first adhesive layer 410 may be disposed between the display panel 100 and the functional plate 300 and a second adhesive layer 420 that is patterned may also be disposed between the window 510 and the functional plate 300. The portable electronic apparatus of FIG. 11 includes an auxiliary adhesive layer 410A that is filled between patterns of the first adhesive layer 410.

Figure 12:
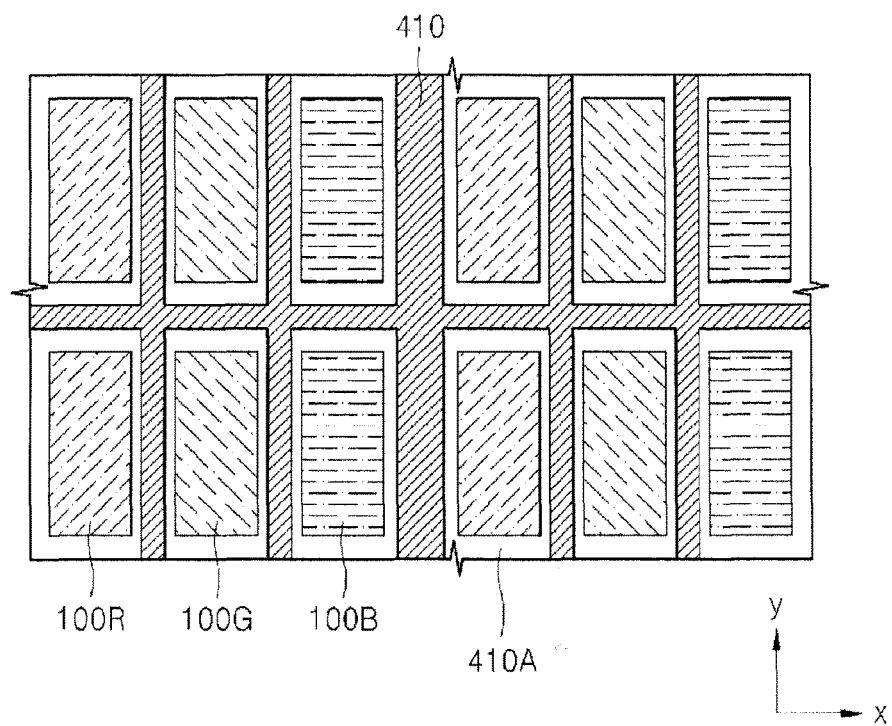
FIG. 12 is a conceptual plan view illustrating a part of a portable electronic apparatus according to another embodiment of the present invention.

FIG. 12 is a conceptual plan view illustrating a part of a portable electronic apparatus according to another embodiment of the present invention. The display panel includes a first adhesive layer 410 and an auxiliary adhesive layer 410A that is filled between patterns of the first adhesive layer 410, which may be disposed to correspond to the black matrix corresponding to a portion between pixels or subpixels 100R, 100G, and 100B.

As described above, according to the one or more of the above embodiments of the present invention, a portable electronic apparatus includes a display panel which is flexible and prevents a defect from occurring when the portable electronic apparatus is bent may be provided. However, the scope of the present invention is not limited to such effects.

While one or more embodiments of the present invention have been described with reference to the figures, it will be understood by those of ordinary skill in the art that various changes in form and details may be made therein without departing from the spirit and scope of the present invention as defined by the following claims. Accordingly, the true technical scope of the present invention is defined by the technical spirit of the appended claims, and equivalents thereof.

What is claimed is:

1. A portable electronic apparatus comprising:
a display panel to display an image;
a functional plate;
a first adhesive layer patterned to have stripe shapes and/or island shapes and disposed between the display panel and the functional plate;
a window over an image display surface of the display panel with the functional plate between the display panel and the window;
a second adhesive layer patterned and disposed between the functional plate and the window; and
an auxiliary adhesive layer filled between patterns of the first adhesive layer and/or between patterns of the second adhesive layer,
wherein the first adhesive layer and the auxiliary adhesive layer contact each other and define a single layer and/or the second adhesive layer and the auxiliary adhesive layer contact each other and define a single layer.

2. A portable electronic apparatus comprising:
a display panel having pixels or subpixels to display an image;
a window over an image display surface of the display panel;
a functional plate between the display panel and the window;
a first adhesive layer patterned to correspond to a portion between the pixels or a portion between subpixels, the first adhesive layer being disposed between the display panel and the functional plate or between the functional plate and the window; and
an auxiliary adhesive layer filled between patterns of the first adhesive layer,
wherein the first adhesive layer and the auxiliary adhesive layer contact each other and define a single layer.

3. The portable electronic apparatus of claim 1, wherein the single layer has a varying adhesive force throughout.

4. The portable electronic apparatus of claim 2, wherein the single layer has a varying adhesive force throughout.

5. The portable electronic apparatus of claim 1, wherein material of the auxiliary adhesive layer is different from that of the first adhesive layer and/or the second adhesive layer.

6. The portable electronic apparatus of claim 2, wherein material of the auxiliary adhesive layer is different from that of the first adhesive layer.

* * * * *